(12) United States Patent
Daniel

(10) Patent No.: US 7,213,488 B2
(45) Date of Patent: May 8, 2007

(54) THREE WAY SWIVEL DIVIDER GEARBOX FOR AGRICULTURAL DRIVE SYSTEMS

(76) Inventor: Jeffrey K. Daniel, 7502 Mesa Rd., Houston, TX (US) 77028

( * ) Notice: Subject to any disclaimer, the term of this patent is extended or adjusted under 35 U.S.C. 154(b) by 14 days.

(21) Appl. No.: 10/757,235

(22) Filed: Jan. 14, 2004

(65) Prior Publication Data
US 2005/0150326 A1   Jul. 14, 2005

(51) Int. Cl.
*F16H 37/06* (2006.01)
*F16H 1/12* (2006.01)

(52) U.S. Cl. ..................... 74/665 H; 74/416

(58) Field of Classification Search ............. 74/15.2, 74/665 R, 665 F, 665 H, 416, 417, 665 GB; 180/53.1, 53.3, 15, 53.6, 900, 53.61, 53.62
See application file for complete search history.

(56) References Cited

U.S. PATENT DOCUMENTS

| | | | | |
|---|---|---|---|---|
| 2,331,073 A | * | 10/1943 | Harvey et al. | 416/123 |
| 3,051,256 A | * | 8/1962 | Brandt | 180/24.08 |
| 3,324,682 A | | 6/1967 | Bendler | |
| 3,332,299 A | * | 7/1967 | Allgaier et al. | 74/665 F |
| 3,412,580 A | | 11/1968 | Cull | |
| 3,768,821 A | * | 10/1973 | Adams | 180/7.2 |
| 3,954,143 A | | 5/1976 | van der Lely | |
| 4,446,756 A | | 5/1984 | Hagin et al. | |
| 4,525,987 A | * | 7/1985 | Werner et al. | 56/15.2 |
| 4,589,857 A | | 5/1986 | Okoshi | |
| 4,609,065 A | * | 9/1986 | Shikiya et al. | 180/261 |
| 4,738,461 A | * | 4/1988 | Stephenson et al. | 280/400 |
| 4,899,523 A | * | 2/1990 | Frumholtz et al. | 56/155 |
| 5,076,111 A | * | 12/1991 | Love | 74/331 |
| 5,099,937 A | | 3/1992 | McLean | |
| 5,131,292 A | * | 7/1992 | Hundebol | 74/665 H |
| 5,152,357 A | | 10/1992 | McLean | |
| 5,158,500 A | | 10/1992 | McLean | |
| 5,186,271 A | | 2/1993 | McLean | |
| 5,247,856 A | * | 9/1993 | Cuypers | 74/665 F |
| 5,339,907 A | * | 8/1994 | Roth | 172/678 |
| 5,415,473 A | * | 5/1995 | Nakano et al. | 366/83 |

(Continued)

FOREIGN PATENT DOCUMENTS

DE      2430767 B  * 12/1976

*Primary Examiner*—Roger Pang
(74) *Attorney, Agent, or Firm*—Jackson Walker L.L.P.; Mark A. Tidwell, Esq.

(57) ABSTRACT

A swivel gearbox system having multiple drivetrain outputs is disclosed. The system comprises a swivel gearbox and an angled divider gearbox where the power input and divided power output shafts are not in the same plane. The swivel gearbox is a right angle gearbox to permit power input to the divider through a 360 degree range. The output shaft of the swivel gearbox functions as the input shaft of the angled, divider gearbox. The input shaft for the swivel gearbox and the multiple divided output shafts for the divider gearbox are positioned relative to one another in parallel, offset planes, shared shaft between the swivel gearbox and the angled, divider gearbox is preferably positioned in a plane perpendicular to the other input and output shafts. In another embodiment, an angled divider gearbox is provided. In a preferred embodiment, the power input shaft is positioned to have an angle perpendicular to the multiple divided power output shafts, thereby dampening power fluctuation effects along the drivetrain between the PTO of a tractor and the driven implements of the agricultural equipment.

2 Claims, 2 Drawing Sheets

U.S. PATENT DOCUMENTS

| | | |
|---|---|---|
| 5,450,714 A | 9/1995 | Lurwig |
| 5,531,283 A * | 7/1996 | Austin et al. ............... 180/53.1 |
| 5,626,007 A | 5/1997 | Harrington et al. |
| 5,896,731 A | 4/1999 | Scheid |
| 5,916,112 A | 6/1999 | Stiefvater et al. |
| 5,950,502 A * | 9/1999 | Genovese ................... 74/640 |
| 6,032,550 A | 3/2000 | Rugh |
| 6,035,619 A | 3/2000 | Loehr |
| 6,044,633 A | 4/2000 | Stiefvater et al. |
| 6,082,085 A | 7/2000 | Stelzer et al. |
| 6,189,668 B1 * | 2/2001 | Richards ...................... 192/61 |
| 6,199,355 B1 | 3/2001 | Stiefvater et al. |
| 6,481,192 B1 | 11/2002 | Harkcom et al. |
| 2004/0221558 A1 * | 11/2004 | Stevenson et al. ............... 56/6 |

\* cited by examiner

THREE WAY SWIVEL DIVIDER GEARBOX FOR AGRICULTURAL DRIVE SYSTEMS

BACKGROUND OF THE INVENTION

1. Field of the Invention

The present invention relates to the field of power transmission for use in mechanized agricultural equipment, and more particularly to a divider gearbox system having a divider gearbox with an angled input shaft relative to the divided, multiple driveline outputs and a right angle, swivel gearbox coupled thereto for providing power input.

2. Description of the Prior Art

In the prior art, it is well known to use constant velocity (CV) joints or gearing to manage the transmission of power from the power take off (PTO) shaft of a tractor to a piece of agricultural machinery such as grain augers, sprayers, mowers, shredders, cutters, tillers, balers, harvesters, seeders, planters and the like. In theory, CV joints are used to transfer a uniform torque and a constant speed between an input shaft and an output shaft or drive axle, while operating through a wide range of angles. This is particularly important for agricultural equipment, such as for example, large flex wing rotary cutters/mowers, since such equipment is likely to be subject to frequent turns and operated on uneven terrain. During use, however, these joints are not designed to handle the high horsepower transmission at high angulations often demanded of such equipment. These high horsepower transmissions at high angulation significantly decrease the operating life of the prior art CV joints and can lead to premature failure. Current CV joints tend to operate at maximum 80 degree angles and it is well known that as the turn angle increases, the ability to maintain a given power level without causing damage to or failure of the CV joint increases. Rather, in turns, operators must slow the tractor to a crawl, shut off the power to the PTO on the tractor, ease into the turn, kick back in the PTO on the tractor, and idle the tractor back up. During mowing season in order to keep equipment running, maintenance often requires daily and sometimes hourly greasing of the CV joint. Further, some farmers and industrial mowing contactors must replace CV joints weekly during peak mowing season. Not only is such maintenance costly, it is also time consuming.

It is also well know in the art to utilize divider gearboxes to split PTO input power from a tractor into multiple drivelines, such as are commonly found on the flex wing cutters mentioned above. In such gearboxes, the power input shaft coupled to the PTO is arranged in the same plane as the multiple power output shafts such that there is no vertical angle between the input shaft axis and the output shaft axes. More particularly, the power input shaft extends from the gearbox housing opposite the divided power output shafts such that power is provided, transferred and divided in the same plane. One drawback to such an arrangement is that energy pulses traveling along the plane are easily transferred from one component, i.e., the power input shaft, to another component, i.e., the divided power output shafts.

Notwithstanding the foregoing, maintaining power during turns is particularly important in equipment that requires multiple drivelines and thus utilizes divider gearboxes. To the extent a CV or similar joint is incorporated into the driveline at some point upstream of such a divider gearbox, any loss of power through the CV joint is made more significant as the driveline is divided or split to provide power to the various driven components of the equipment. Called driveline "thrusting", this result is due in part to the substantial alignment of the PTO, CV joint and divider all in the same plane. In other words, this so called "thrusting" effect has been observed to pass down such an aligned drivetrain causing interruption. Heretofore, nothing in the prior art provides a system for splitting or dividing drivetrain power without amplifying the loss of power resulting from CV or similar joint.

SUMMARY OF THE INVENTION

These and other objectives are achieved through a swivel gearbox system having multiple drivetrain outputs. The system achieves the aforementioned objectives by providing a divider gearbox where the power input and divided power output shafts are not in the same plane and by incorporating a swivel gearbox to replace the CV joints common in the prior art. The system is comprised generally of a first right angle swivel gearbox for delivering power from the PTO and a second angled input divider gearbox for splitting driveline power, wherein the output shaft of the first gearbox operates as the input shaft of the second gearbox. The input shaft for the first gearbox and the output shafts for the second gearbox are positioned relative to one another in parallel, offset planes, while the first gearbox output shaft/second gearbox input shaft is preferably positioned in a plane perpendicular to the other input and output shafts. In such a configuration, the first gearbox functions as the pivot or "steering" gearbox, while the second gearbox functions to split the power input without loss of power associated with decoupled CV joints and divider gearboxes of the prior art. By providing such a configuration, full power can be maintained at any rotational angle between the tractor PTO and the driven implement, the primary limitation being the turning ability of the tractor relative to the equipment.

In another embodiment, an angled divider gearbox is provided. Such a gearbox consists of a housing from which extends a power input shaft and multiple power output shafts. The power input shaft is positioned to have an angle perpendicular to the power output shafts. As such, any thrusting occurring on the power input side of the divider gearbox is diminished or dampened as it passes through to the divided output shafts. In yet another embodiment, while not positioned at a right angle, the axis of the input shaft and the axes of the divided output shafts are angled relative to one another, again diminishing the effects of thrusting on the divided drivelines.

DETAILED DESCRIPTION OF THE PREFERRED EMBODIMENT

In the detailed description of the invention, like numerals are employed to designate like parts throughout. Various items of equipment, such as fasteners, fittings, etc., may be omitted to simplify the description. However, those skilled in the art will realize that such conventional equipment can be employed as desired.

Figure 1:
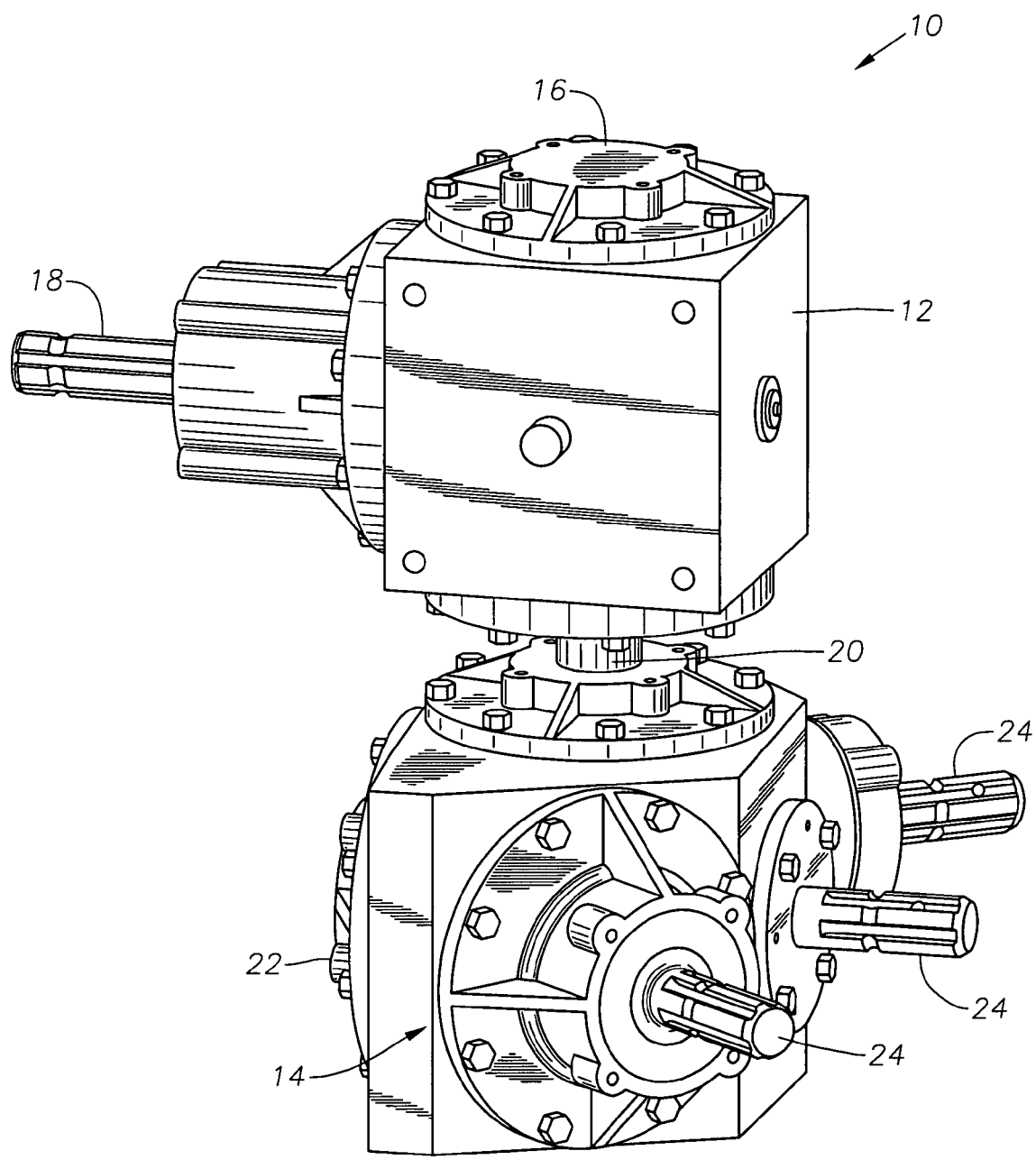
FIG. 1 is an elevation view of a first embodiment of the divider swivel gearbox of the invention.

With reference to FIG. 1, there is shown a swivel, divider gearbox system 10 of the invention. Gearbox system 10 is comprised of a first gearbox 12 coupled to a second gearbox 14. First gearbox 10 is a right angle gearbox having a casing 16 from which extends a power input shaft 18 and a power output shaft 20. Input shaft 18 and output shaft 20 are positioned at a right angle to one another such that the relative axes of the two shafts are perpendicular.

Second gearbox 14 is an angled divider gearbox having a casing 22 from which extends at least two power output shafts 24. Those skilled in the art will understand that while the gearbox 14 is illustrated with three output shafts 24, the invention encompasses output shafts 24 of two or more. In any event, output shaft 20 of first gearbox 12 functions to provide input power to second gearbox 14 and as such, is shown extending from casing 22. As can be seen, shaft 20 and output shafts 24 are positioned at a right angle such that the axis of shaft 20 is perpendicular to the axes of shafts 24. Likewise in such an arrangement, the axis of first gearbox shaft 18 and second gearbox shafts 24 are offset from, but parallel with, one another. While shaft 20 is shown as a single shaft connecting gearbox 12 and gearbox 14, the coupling of gearbox 12 and gearbox 14 can be accomplished by a driveline or separate shafts coupled together. Furthermore, while first gearbox 12 has been described as a right angle gearbox in one preferred embodiment of the invention, it is understood that the angle between input shaft 18 and output shaft 20 need not be 90 degrees so long as the two shafts are not axially aligned. In other words, so long as gearbox 12 can swivel relative to gearbox 14, the goals of the invention are achieved. In one such embodiment, the angle between input shaft 18 and output shaft 20 is obtuse.

Figure 2:
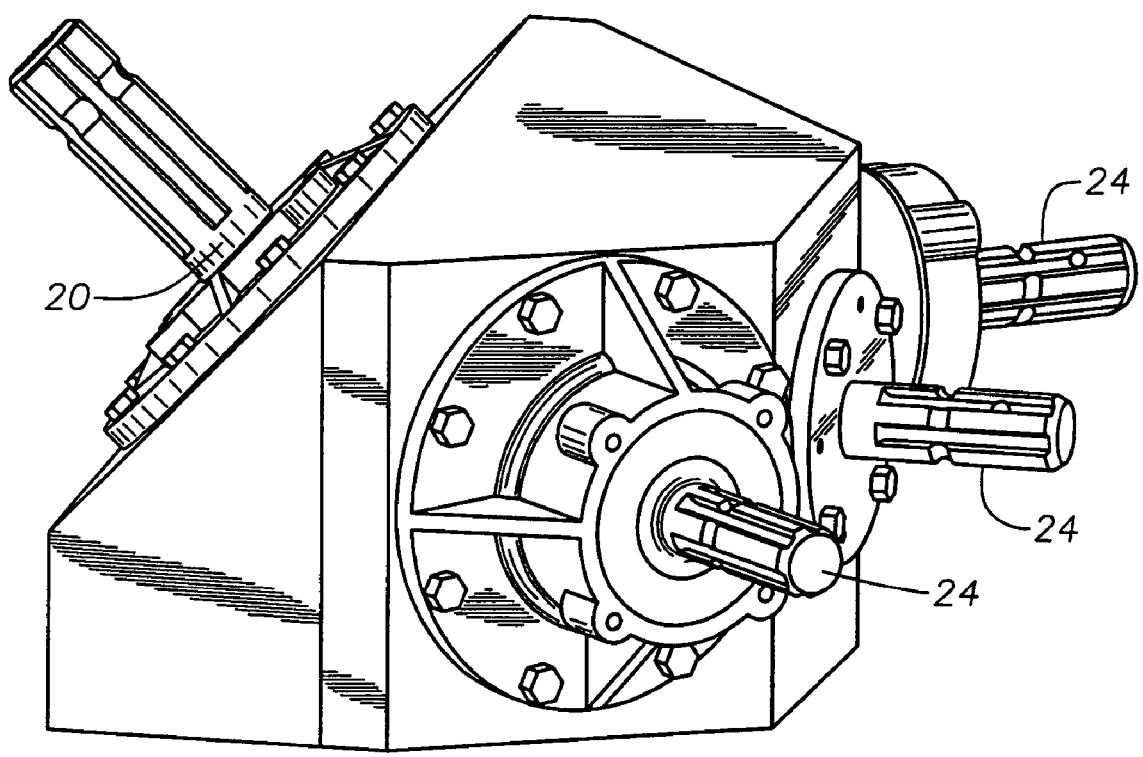
FIG. 2 is an elevation view of an angled divider gearbox of the invention in which the power input shaft is perpendicular to the divided power output shafts.

Turning to FIG. 2, second gearbox 14 is shown without a pivot gearbox attached. FIG. 2 highlights the differences of the divider gearbox of the invention over divider gearboxes of the prior art, namely that the power input shaft 20 of second gearbox 14 is arranged so as not to be in the same plane as divided output shafts 24. In the particular configuration of FIG. 2, power input shaft 20 is shown extending from housing 22 at a 90 degree, or right angle, to power output shafts 24. Those skilled in the art will understand that a right angle such as this is likely to result in the greatest amount of dampening of any "thrusting" passing down the upstream side of the divider gearbox. However, it is contemplated that other angles will also have a dampening effect, so long as the power input shaft 20 and divided output shafts 24 are not arranged to be in the same plane, i.e., having an angle of 0 degrees or 180 degrees between the input and output shafts. In one such embodiment, the angle between input shaft 20 and the divided output shafts 24 is obtuse.

The above-described divider gearbox with an input shaft angled relative to the output shafts will dampen effects of inconsistent power passing down the drive train to the driven implement. To the extent such a divider gearbox forms a swivel divider gearbox system 10, a tractor can make a turn with full PTO power connected at all times and this power will be transmitted via the swivel gearbox to each of the divided outputs. While system 10 can swivel a full 360 degrees, a turning angle of 90 degrees is likely to be the maximum angle required of the system because of current tractor designs and interference between the tractor and agricultural equipment hitched thereto. For divider gearbox 14 and swivel gearbox 12 integrated into a single system 10 as contemplated in one embodiment of the invention, gearbox 14 and gearbox 12 can all operate in a common oil bath, further reducing maintenance.

Swivel divider gearbox 10 as described with two or more outputs in the same plane and substantially perpendicular to one another is particularly useful for agricultural equipment such as sprayers, mowers, shredders, cutters, tillers, balers, harvesters, seeders, planters and the like. Furthermore, swivel divider gearbox 10 as described with a PTO input angled relative to two outputs so as not to be perpendicular or parallel thereto is particularly useful for agricultural equipment such as grain augers where the PTO input is typically at an angle of 55°, and the gearbox outputs driving the main auger and loading auger may be at skewed angles.

While certain features and embodiments of the invention have been described in detail herein, it will be readily understood that the invention encompasses all modifications and enhancements within the scope and spirit of the following claims.

What is claimed is:

1. A swivel divider gearbox for agricultural equipment, said gearbox comprising:
   A. a first gearbox having an input shaft and an output shaft, wherein said input shaft forms an angle with said output shaft; and
   B. a second gearbox having an input shaft and at least two output shafts characterized by an angle between said two output shaft,
   C. wherein said input shaft of the second gearbox is the output shaft of the first gearbox and the input shaft of the second gearbox is substantially perpendicular to at least one output shaft of the second gearbox,
   D. wherein the angle between the two output shafts of the second gearbox is less than one hundred eighty degrees.

2. The gearbox system of claim 1, wherein said second gearbox has three output shafts.

* * * * *